United States Patent [19]

Obrietan

[11] Patent Number: 4,841,795
[45] Date of Patent: Jun. 27, 1989

[54] DOUBLE-ROTATABLE UNIVERSAL HEAD FOR MACHINE TOOLS

[75] Inventor: Gioacchino Obrietan, Valdagno, Italy

[73] Assignee: Novar S.p.A., Valdagno, Italy

[21] Appl. No.: 7,286

[22] Filed: Jan. 27, 1987

[30] Foreign Application Priority Data

Jan. 27, 1986 [IT] Italy .................. 84102 A/86

[51] Int. Cl.$^4$ .................. F16H 1/14; B25J 17/02; F16D 25/061
[52] U.S. Cl. .................. 74/417; 74/411.5; 74/469; 192/71; 192/85 A; 901/9; 901/26; 901/29
[58] Field of Search .................. 74/417, 411.5, 423, 74/469, 479, 661, 665 B, 665 E; 901/26, 29, 9; 414/735, 738; 192/71, 48.4, 48.9, 85 A

[56] References Cited

U.S. PATENT DOCUMENTS

| | | | |
|---|---|---|---|
| 1,869,085 | 7/1932 | Williamson | 192/85 R |
| 2,364,329 | 12/1944 | Waldo et al. | 74/824 |
| 2,471,403 | 5/1949 | Benes | 74/824 X |
| 3,054,491 | 9/1962 | Bloch et al. | 192/48.9 X |
| 3,142,202 | 7/1964 | Muhlbeyer | 74/665 B |
| 3,185,256 | 5/1965 | Schilling | 192/66 |
| 4,068,536 | 1/1978 | Stackhouse | 901/26 |
| 4,271,471 | 6/1981 | Castner | 901/9 X |
| 4,356,554 | 10/1982 | Susnjara et al. | 901/26 |
| 4,484,871 | 11/1984 | Adman | 74/661 X |
| 4,553,077 | 11/1985 | Brantmark et al. | 901/9 |
| 4,574,655 | 3/1986 | Kimura et al. | 901/26 X |
| 4,578,749 | 3/1986 | Kuno et al. | 901/9 X |
| 4,605,122 | 8/1986 | Biddle | 74/411.5 X |
| 4,606,695 | 8/1986 | Lenz | 414/735 |
| 4,610,584 | 9/1986 | Malzkorn et al. | 74/423 X |
| 4,627,786 | 12/1986 | Minematsu et al. | 901/26 |

FOREIGN PATENT DOCUMENTS 2049075 12/1980 United Kingdom .................. 74/417

*Primary Examiner*—Allan D. Herrmann
*Attorney, Agent, or Firm*—Hoffman, Wasson, Fallow & Gitler

[57] ABSTRACT

A universal head for fitting to a machine tool slide comprises a spindle head supporting a spindle and a head carrier interposed between the spindle head and the slide in order to transmit torque from the machine tool drive shaft to the spindle. The carrier is rotatable with respect to the slide and the spindle head is rotatable with respect to the carrier along mutually oblique axes. Ordinarily, relative rotation between the spindle head, carrier and machine tool are prevented by hydraulically-actuated brakes and only the spindle is driven by the drive shaft; however, when it is desired to reorient the spindle axis, rotation of the spindle is prevented while the brakes are selectively released so that drive shaft rotation results in movement of the spindle head.

13 Claims, 1 Drawing Sheet

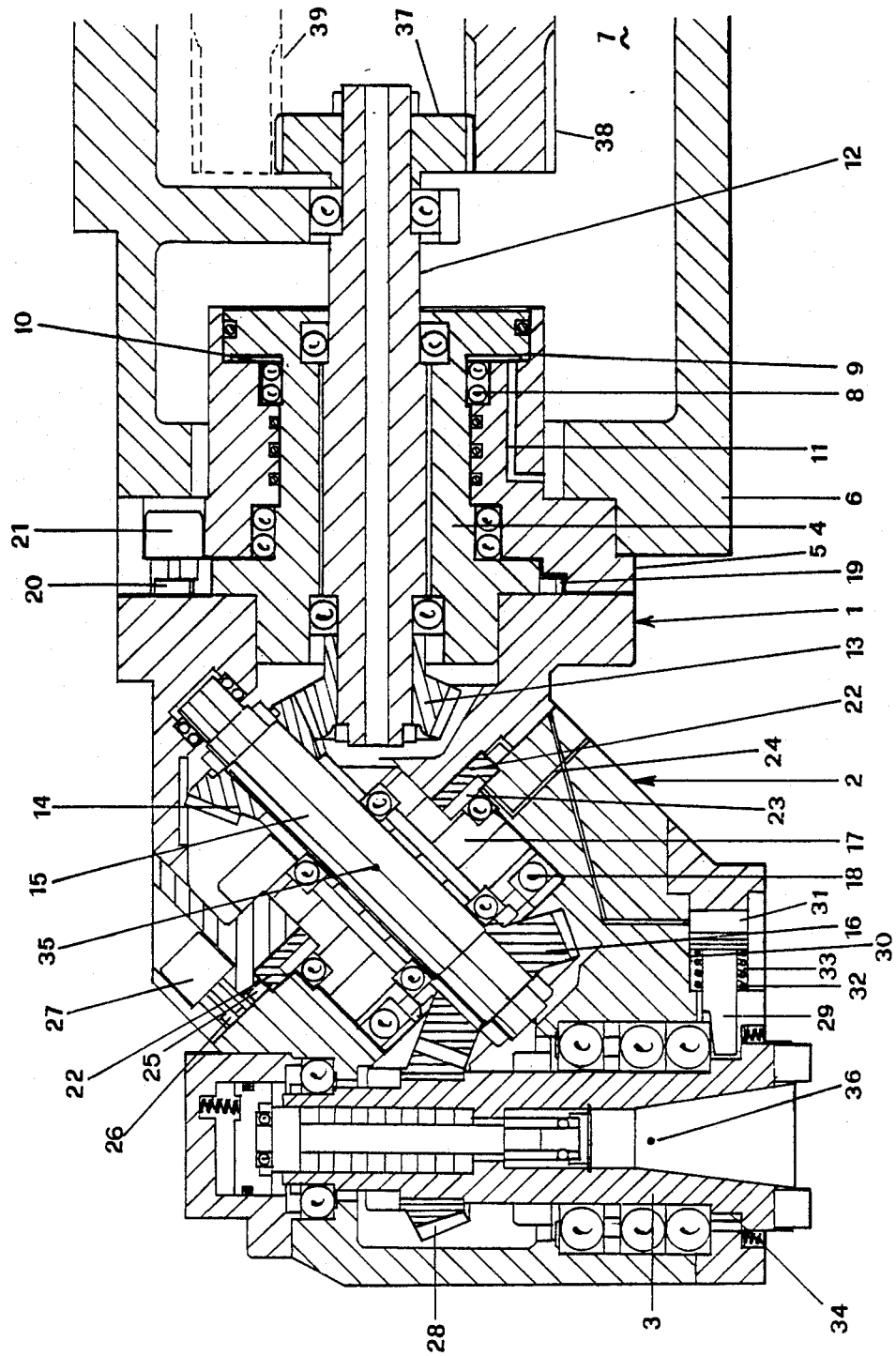

4,841,795

DOUBLE-ROTATABLE UNIVERSAL HEAD FOR MACHINE TOOLS

BACKGROUND OF THE INVENTION

This invention relates to a double-rotatable universal head for machine tools.

Double-rotatable universal heads for machine tools are known. They receive their motion from a generally horizontal drive shaft and transmit it to the spindle shaft irrespective of the orientation of this latter.

One of such known heads comprises substantially a head carrier rotatably connected to the machine tool slide, and an actual head rotatably connected to the head carrier and having that surfaace in contact therewith inclined at 45° to the drive shaft axis.

The head carrier is provided internally with a motion transmission shaft inclined at 445° to the drive shaft and to the spindle axis.

In order to position the spindle in the required direction, the operator slackens the connection bolts, rotates the head carrier about the slide and rotates the head carrier. Suitable tables define the angles through which the head and head carrier have to be rotated in order to position the spindle in the required direction.

These known heads suffer however form certain drawbacks, and in particular:

a lengthy time period necessary to position the spindle in the required direction because of the bolt and screw connection system between the mutually coupled parts, a certain operator difficulty in setting the spindle in the required position because of the weight and size of the head and head carrier.

To obviate these drawbacks, automatically positionable universal heads have been proposed in which the head and head carrier are oriented by means of two direct current motors.

However, such heads have other drawbacks, in particular an additional cost and large overall size due to the presence of the two motors and their relative dependent systems. Moreover, the power developed by the spindle cannot exceed a certain value because the head, head carrier and slide are locked together by the action of the motors and rotation mechanisms themselves, with obvious limited efficiency.

A head is also known in which the engagement between the head carrier and slide and between the head and head carrier is obtained by an insertion-fit system, commonly known as "irt" toothing, comprising two annular flanges having their facing surfaces provided with teeth. The head and head carrier are oriented by means of a motor or a pneumatic or hydraulic system, and once they have reached their required position they are locked together by the engagement of the teeth.

The drawbacks of this head consist of high cost due to the rotation system and coupling device, and the noninfinitely variable adjustment which is obviously related to the toothing pitch.

SUMMARY OF THE INVENTION

An object of the invention is to obviate the drawbacks jointly and separately present in known heads by providing a double-rotatable universal head for machine tools which is of low cost and small overall size, and which requires no manual fixing system.

A further object of the invention is to provide a head which enables the spindle to be oriented in any direction without requiring any additional positioning motor.

A further object of the invention is to provide a universal head which can also be controlled by a numerical control system.

These and further objects which will be apparent from the description given hereinafter are attained according to the invention by a double-rotatable universal head for fitting to a machine tool slide and comprising an actual head supporting the spindle, and if necessary a head carrier interposed between the actual head and slide in order to transmit the drive shaft rotation of the machine tool to the spindle, said head and said slide, as well as said head carrier being rotatably coupled to each other in an adjustable way according to surfaaces angulated with respect to the axis of the respective rotation means, in order to orientate the spindle axis in the required direction, and being provided with mutual locking means in the preferred angular position, characterised in that said relative rotation means consist of a member for blocking the rotation of the spindle relative to the actual head, while said locking means are disactivated and the spindle is rotated.

BRIEF DESCRIPTION OF THE DRAWING

A preferred embodiment of the present invention is described hereinafter with reference to the accompanying drawing which shows an enlarged longitudinal section through a universal head according to the invention.

DESCRIPTION OF THE PREFERRED EMBODIMENT

As can be seen from the drawing, the universal head according to the invention comprises substantially a head carrier 1 and an actual head 2 supporting a spindle 3.

The head carrier comprises a cylindrical support 4 inserted into a complementary flange 5 rigid with the slide 6 of the machine tool 7. Rolling-contact bearings 8 are provided between the facing surfaces of the flange 5 and support 4.

To the rear end of the support 4 there is fitted an annular flange 9 which together with a corresponding stepped portion of the flange 5 forms an annular chamber 10 fitted with oil originating from a duct 11 connected to a central hydraulic unit (not shown on the drawing).

The front end of the drive shaft 12 of the machine tool 7 is housed within the support 4: at the rear end the shaft 12 is provided with a gear wheel 37 engaged with a pinion 38 rotated by the electric motor of the machine tool, not shown on the drawing; furthermore it is provided at its front with a bevel gear 13 engaging with a corresponding bevel gear 14 rigid with a distributor shaft 15 which extends axially into the head 2.

The shaft 15 has its axis disposed at 45° both to the axis of the drive shaft 12 and to the axis of the spindle 3, and is also provided at its front end with a further bevel gear 16.

The shaft 15 is housed in a cylindrical support 17 which is itself housed in a corresponding cylindrical cavity provided axially in the head 2, suitable rolling-contact bearings 18 being interposed between the facing surfaces of said cylindrical cavity and support 17.

The head carrier 1 also comprises a perimetral rim with precision toothing 19, in which there engages a corresponding gear wheel 20 the shaft of which is rigid with an encoder 21 mounted on the slide 6.

To the rear of the head 2 there is fitted an annular flange 22 which together with a forward-lying step provided in the support 17 forms a chamber 23 filled with oil and communicating by way of a duct 24 with the central hydraulic unit.

The head 2 also comprises a perimetral rim with precision toothing 25, in which there engages a corresponding gear wheel 26 the shaft of which is rigid with an encoder 27 mounted on the head carrier 1.

A gear wheel 28 is connected to the spindle 3 and forms a bevel gear pair with the gear wheel 16 connected to the shaft 15. An externally toothed flange 34 is provided in correspondence with the lower end of the spindle 3.

In correspondence with said flange 34 there is provided a piston 29 which is housed in a cylindrical cavity 30 formed in the head 2 and has its axis orthogonal to the axis of the spindle 3. That part 31 of the cavity 30 which lies upstream of the piston 29 is filled with oil, the feed duct of which is connected to the central hydraulic unit, whereas that part 32 of the cavity 30 which lies downstream of the piston 29 houses a spiral spring 33 disposed coaxially to the piston.

Both the encoders 21 and 27 are connected to a central electronic unit which controls the correct operation of the various components and enables all operations to be automated.

The operation of the universal head according to the invention is as follows: when in the configuration shown on the drawing, the head carrier 1 is connected to the slide 6 and the head 2 is connected to the head carrier 1 such that the axes of the drive shaft 12, distributor shaft 15 and spindle 3 are coplanar. In this configuration the rotary motion of the drive shaft 12 is transmitted to the spindle 3, which is disposed vertically.

In order to orientate the spindle in a predetermined direction the procedure is as follows: the angles through which the head carrier 1 is to rotate about the slide 6 and through which the head 2 is to rotate about the head carrier 1 in order to orientate the axis of the spindle 3 in the said predetermined direction are set on the central electronic control unit. These angle values are obtained from tables drawn up for this purpose.

On switching on the machine tool, the central electronic unit causes the oil to enter at high pressure into the chambers 10 and 23, which increases in volume and press against the relative flanges 9 and 22. In this manner, the facing surfaces of the head carrier 1 and slide 6 are caused to adhere to each other, as are the facing surfaces of the head 2 and head carrier 1, which thus become rigidly locked together.

The drive shaft 12 is then caused to rotate at minimum rotation speed, and the pressure in the chamber 10 is then reduced. By virtue of this pressure reduction, the force under which the head carrier surface presses against the facing surface of the slide 1 is substantially reduced, so enabling the head carrier 1 to rotate about the slide 6, while remaining engaged with it.

Oil is simultaneously fed under pressure into the chamber 31 to cause the piston 29 to advance and engage the toothed portion of the flange of the spindle 3, block it so that it is unable to rotate with respect to the head 2. As a result of this blocking of the spindle 3, axial rotation of the distributor shaft 15 engaged with it is also prevented. However as the shaft 15 is also engaged with the drive shaft 12, which is in the process of rotating, the former is compelled to rotate about the latter with centre of rotation at the point 35 at which the axis of the shaft 12 meets the axis of the shaft 15. Consequently the head carrier 1 is compelled to rotate about the slide 6, and this rotation continues until the encoder 21 has coded the previously set rotation value. At this point, the central electronic unit halts the rotation of the drive shaft 12 and stops the feed of pressurised oil into the chamber 10, while at the same time reducing the pressure in the chamber 23.

In this manner the rigid connection between the head carrier 1 and slide 6 is re-established, whereas the head and head carrier become mutually released.

The drive shaft 12 is again operated, and as the spindle 3 is still blocked with respect to the head 2, it is compelled to rotate about the distributor shaft 15 with centre of rotation at the point 36 at which its axis meets the axis of said shaft 15. Consequently the head is compelled to rotate about the head carrier, and this rotation continues until the encoder 27 has coded the set rotation value.

When this value has been attained, the central electronic unit causes oil to be fed under pressure into the chamber 22 so that the head and head carrier again become connected to each other, while simultaneously reducing the pressure in the chamber 31 so that the elastic reaction of the spiral spring 23 causes the piston 29 to disengage from the toothed portion of the flange 34 of the spindle 3, which is thus free to rotate.

From the aforegoing it is clear that the universal head according to the invention offers numerous advantages, and in particular:

it is of low cost as it uses the same drive shaft for rotating the head and head carrier, it is of small overall dimensions, its size being substantially that of currently known heads, it makes it possible to orientate the spindle in any direction in an almost infinitely variable manner, it does not require the use of connection elements such ad bolts or screws, as engagement takes place by mutual adhesion between the individual parts, it allows complete automation of the machine tool which is preferably controlled by a computer.

In a preferred embodiment it is foreseen to use together with the motor driving the spindle, a further direct current motor which is used only for adjustment operations. This low-power motor, which can be engaged with the drive shaft 12, e.g., through a second pinion 39, shown with the dotted line on the drawing, allows to very effectively adjust the angular position of the head 2 with respect to the head carrier 1 and of the head carrier 1 with respect to the slide 6.

Furthermore, in order to reach an almost absolute precision, at least in the more used configurations, it is preferable that the moving reciprocally elements, that is the head 2, the head carrier 1 and the slide 6, are provided with holes (not shown on the drawing) which in correspondence of these positions are faced and such as to allow the automatic insertion of the pins which rigorously determine these positions. Practically the four most used positions are those in correspondence of which the axis of the spindle is vertical (see the drawing), or it is parallel to the axis of the drive shaft 12, or it is placed horizontal and orthogonal with respect to this at the left or at the right.

Furthermore between the head 2, head carrier 1 and slide 6, a pair of electronic cards is foreseen connected to each other to transmit the data necessary for the correct operating of the head, independently from their mutual angular position. This connection between the cards can be carried out through an electronic joint (wiping contact) which allows the free rotation of the several elements without any restrictions. It is also possible to provide an electronic circuit which automatically zeros the rotation of 360° and only takes into account the fraction of circle angle, thus avoiding accumulating the possible mistakes that a high number of complete rotations could cause.

The described double-rotatable universal head allows one to orientate, as already said, the axis of the spindle 3 in any direction. Moreover it belongs to the scope of the protection, as it uses at least in its general principle the same inventive idea, also a universal head having an easier realization, in which the head 2 is directly engaged with the slide 6. It is clear that this embodiment requires that the axis of the spindle cannot be oriented in the desired direction, but only along the generatrices of a conic surface having an opening angle corresponding to the angle formed by the axis of the drive shaft and the axis of the spindle, but it is also clear that this restriction can be accepted for particular works, taking into account the more constructive simplicity that in such a case can be obtained.

What is claimed is:

1. A universal head for fitting to a machine tool, said universal head comprising
    a carrier head mounted on said machine tool and capable of rotation with respect thereto about a first axis,
    first means for normally preventing said carrier head from rotating with respect to said machine tool,
    a spindle head mounted on said carrier head, and capable of rotation with respect thereto about a second axis oblique to said first axis,
    second means for normally preventing said spindle head from rotating with respect to said carrier head,
    only one rotary driveshaft extending into said carrier head from said machine tool along said first axis,
    an intermediate shaft extending along said second axis from said carrier head into said spindle head,
    a spindle shaft rotatably supported within said spindle head, and having a third axis of rotation oblique to said second axis, said spindle shaft having a tool receiver,
    said driveshaft, intermediate shaft and spindle shaft being interconnected so as to rotate in unison as long as said spindle head and said carrier head are prevented from rotating,
    third means for preventing spindle rotation, and
    means, operable in conjunction with said spindle rotation preventing means, for releasing a selected one of said first and second rotation preventing means so as to permit the corresponding head to be rotated by said driveshaft, thus reorienting said third axis.

2. The invention of claim 1, wherein said first and second axes subtend an angle of 450°.

3. The invention of claim 2, wherein said second and third axes subtend an angle of 45°.

4. The invention of claim 1, further comprising a set of bevel gears interconnecting said drive shaft and said intermediate shaft.

5. The invention of claim 1, further comprising a set of bevel gears interconnecting said intermediate shaft and said spindle shaft.

6. The invention of claim 1, wherein said machine tool and said carrier head have respective planar mating surfaces, each perpendicular to said first axis.

7. The invention of claim 1 wherein the means for preventing rotation of the carrier head relative to the machine tool comprises at least one hydraulically-operated piston which, when pressure is applied thereto, induces forced adhesion between a surface on the carrier head and a surface on the machine tool.

8. The invention of claim 7 wherein said piston has an annular shape and cooperates with an annular surface on one of said heads.

9. The invention of claim 1, wherein said carrier head and said spindle head have respective planar mating surfaces, each perpendicular to said second axis.

10. The invention of claim 1 wherein said spindle rotation preventing means comprises a piston disposed within the spindle head and movable in a direction orthogonal to the axis of rotation of the spindle for engaging the spindle.

11. The invention of claim 10 wherein said spindle has a toothed portion thereon and said piston engages said toothed portion upon activation.

12. The invention of claim 10, further comprising at least one transducer for measuring the angle of rotation of the spindle and an electronic control unit responsive thereto, and wherein said piston is operated by said electronic control unit.

13. The invention of claim 12 wherein said transducer comprises a toothed rim and a gear wheel engaged therewith, and an encoder coupled to said gear wheel, said rim and said encoder being fixed upon respective relatively moving elements of said universal head.

* * * * *